3,095,311
GLASS COMPOSITIONS
Guido von Wranau, Plainfield, and Charles J. Phillips, New Brunswick, N.J., assignors of 102/200 to said Von Wranau, 38/200 to said Phillips, 9/200 to Thomas T. Chappell, Cedar Knolls, 33/200 to Raymond J. Lamb, Ridgewood, 9/200 to H. Curtis Meanor, Glen Ridge, and 9/200 to Walter A. Sproule, Rutherford, N.J.
No Drawing. Filed June 29, 1960, Ser. No. 39,462
13 Claims. (Cl. 106—50)

This invention relates to glass compositions suitable for the manufacture of glass products requiring extremely high chemical stability, for instance, glass fibers and pharmaceutical containers, and it also relates to the glass products themselves, as well as to a method of drawing glass fibers.

As far as compositions for glass products of high chemical stability are concerned, commonly used glasses, such as soda-lime glasses, are unsuited. Fibers, for instance, when made of such glasses, are not resistant to the dissolving action of the atmosphere. They show poor chemical durability and corrode quickly. Yet, in the case of textiles, when made of glass fibers, high resistance to atmospheric conditions is an unconditional requirement.

There was the belief that it is the alkali in common glasses, that is dissolved by water adsorbed from the atmosphere and, thus, is the reason for poor chemical durability, and various suggestions were, therefore, made for alkali-free glasses or glasses practically free of alkali, to be used for the attenuation of fibers, which suggestions were directed toward substituting boron oxide for alkali metal oxides. In fact, borosilicate type glasses have found wide use in fiber attenuation. However, while the compositions used satisfy the requirements for insolubility and electrical insulation, they have the disadvantage of requiring very high temperatures to melt and to achieve the fluidity needed for fining the glass mass.

A known fiber glass composition is formulated as follows:

|  | Percent |
|---|---|
| $SiO_2$ | 52 to 56 |
| $Al_2O_3$ | 12 to 16 |
| CaO | 16 to 19 |
| $B_2O_3$ | 9 to 11 |
| MgO | 3 to 6 |

The drawing or fiber-forming range of this composition lies well above 2400° F., and its melting temperature lies still higher. It will be appreciated that such temperatures, in combination with the chemical attack, have a most destructive effect on the refractories. In addition, the high temperatures required would be injurious to the attenuating bushings unless they are made of platinum. Thus, according to a known glass fiber-drawing process in actual use, according to which little balls (marbles) of glass are made first and are then, upon inspection for impurities and prior to the drawing of the fibers, remelted, the remelting is done in a furnace made completely of platinum.

The following is an example of a widely used borosilicate composition, referred to hereinafter for comparison and explanatory purposes as "prior composition":

|  | Percent |
|---|---|
| $SiO_2$ | 54.5 |
| $Al_2O_3$ | 14.5 |
| CaO | 22.0 |
| $B_2O_3$ | 8.5 |
| $Na_2O$ | 0.5 |

The use of compositions of the above given two formulations and of similar formulations is not fully satisfactory inasmuch as these compositions require a large investment in platinum for the furnaces and attenuating bushings, necessitate extremely careful control of the temperatures at the spinnerets, and are destructive to the refractories.

The primary object of the present invention is to provide glass products of high chemical stability and to generally improve glasses to be used for the manufacture of such products.

A more specific and important object of our invention is to provide glass compositions which may be melted and formed into fibers at temperatures which will be less injurious to the furnace refractories and will not require spinnerets made of platinum and which, at the same time, have very high chemical durability.

Further objects of this invention center about glass formulations which will allow the formation of fibers not only at lower temperatures than up to now but also over a relatively wide operating range, making sure that the temperature control will not be too critical, and which will be resistant to devitrification. By operating range is meant the temperature limits at which the bushings in the fiberizing apparatus must be maintained. The temperature limits correspond approximately to viscosities from log 2 to log 3, i.e. from 100 to 1000 poises. By devitrification resistance is meant the tendency to retain the high viscosity at the liquidus temperature to provide for effective attenuation of fibers without, however, the danger of crystallization.

An extensive program of experimentation, resting on numerous series of widely varying compositions, has led us to low-alkali lime-alumino-silcates showing a substantial decrease of the boron oxide content, as compared with the known borosilicates, and the presence of certain addition agents. The glasses we have discovered do not have the disadvantage of the borosilicates so far used for the attenuation of fibers, but will embody all the commercially desired advantages, such as low melting and fiber-forming temperatures, a sufficiently wide operating range, the yield of a fiber of good corrosion resistance, high chemical durability, good electrical insulating properties, and good devitrification resistance.

The glasses of our invention lie within the following ranges in percentages by weight:

|  | Percent |
|---|---|
| $SiO_2$ | 40 to 59 |
| $Al_2O_3$ | 7 to 17 |
| CaO | 9 to 24 |
| PbO | 0 to 11 |
| ZnO | 0 to 11 |
| BaO | 0 to 5 |
| MgO | 0 to 5 |
| $CaF_2$ | 0 to 3 |
| $B_2O_3$ | 0 to 6 |
| $TiO_2$ | 0 to 7 |
| $ZrO_2$ | 0 to 4 |
| $Li_2O$ | 1 to 4 |
| $Na_2O$ | 0 to 2 |
| $K_2O$ | 0 to 6 |

The limits as given hereinbefore of the constituents of our compositions have been determined by compounding batches within and including these limits and determining that the melting temperature (temperature in the melting zone) does not exceed 2450° F. and is mostly considerably lower, that the fiber-forming temperatures vary between approximately 2000° F. and 2450° F., and that the chemical durability with respect to water varies between about .014 and .049% of loss in weight.

It is to be noted that the durability tests were made by melting the compositions into a disk about 2" in diameter and ¼" in thickness. The disk was then crushed into a powder that passed a 50 mesh screen and did not pass a 100 mesh screen. An amount of the glass powder thus obtained was weighed to the 3rd decimal point, put in distilled water, boiled for four hours, filtered, dried, and reweighed. The loss in weight, expressed in percent, indicates the solubility in water. To ascertain the loss in HCl 5%, glass powder was boiled in HCl 5% for four hours, filtered, washed, dried and reweighed.

The following table shows some of the differences between the behaviour of our Composition 9, the formulation of which is indicated hereinafter, and the "prior composition":

|  | Composition 9 | Prior composition |
|---|---|---|
| Melting temp., viscosity log 2, °F | 2,385 | 2,810 |
| Fiber-drawing temp., viscosity log 2–3, °F | 2020–2385 | 2370–2810 |
| Solubility in water, percent | .026 | .048 |
| Solubility in HCl 5%, percent | .870 | 1.200 |

It will be appreciated that the melting and fiber-forming temperatures of our compositions are lower than the respective temperature of the "prior composition" or the known compositions, and that the chemical durability of the present composition is greater. The melting and fiber-forming temperatures, the working ranges, and chemical resistance to water are indicated for each of the specific compositions listed hereinafter. And it will be apparent that the compositions of our invention, when compared with the "prior composition," have about the same silica content, a considerably decreased boron oxide content, and various added agents.

In working with compositions according to the invention and testing the fiber-drawing properties of individual compositions, we observed certain important regularities. Thus, the combined amounts of $SiO_2$ and $Al_2O_3$ vary between approximately 55 and 66 percent, which means that neither the combined lower limit quantities nor the combined upper limit quantities of both $SiO_2$ and $Al_2O_3$ would ensure satisfactory results.

Similarly, the combined quantities of CaO, PbO, ZnO, BaO, and MgO amount to a range from about 19 to 31 percent. In this connection, it should be noted that CaO alone could largely satisfy this requirement and, therefore, could be used alone, omitting all or any combinations or any one of the lead, zinc, barium, and magnesium oxides, but it has been found that Zn and/or Mg improves the resistance to devitrification.

$TiO_2$ and $ZrO_3$ increase the resistance to solubilizing influences. If titanium dioxide is omitted, the solubility doubles and triples. Zirconium dioxide acts similarly as does $TiO_2$ but to a lesser degree. Also, $ZrO_2$ tends to raise the melting temperature of the batch.

$B_2O_3$ is a useful flux which lowers the melting point. $Li_2O$, $Na_2O$, and $K_2O$ are important, making the glass melt easily.

Out of $Li_2O$, $Na_2O$, and $K_2O$, we prefer to use simultaneously at least two of the three alkali oxides. As can be seen from the foregoing general formulation of our composition, $Li_2O$ is present in every case.

We have further found that if two glasses are compared for chemical durability, and these two glasses are substantially identical in composition, except that the first glass has, for instance, 1.0% $Na_2O$ and 3.0% $Li_2O$, and the second glass 0.8% $Na_2O$ and 1.9% $Li_2O$, the first will be 50% more durable than the second despite its much higher alkali content.

It should be noted that it has been known for a long time that a ratio of 2.0 to 2.5 times more $K_2O$ than $Na_2O$ gives better durability than any other proportion, but it now appears that, with the same total amount of alkali oxides, the presence of $Li_2O$ ensures better durability than any combination of $Na_2O$ and $K_2O$.

If the amounts of some of the hereinbefore referred to addition agents, namely $TiO_2$, $ZrO_2$, $Li_2O$, $Na_2O$, and $K_2O$, are increased or decreased so that they will be outside the limits indicated, then either the chemical durability or the fiber-drawing temperature or both will be radically changed.

The following compositions are examples of formulations which have been found satisfactory:

|  | Compositions | | |
|---|---|---|---|
|  | 1 | 2 | 3 |
| Percent: | | | |
| $SiO_2$ | 48.3 | 48.3 | 50.8 |
| $Al_2O_3$ | 15.0 | 13.0 | 10.5 |
| CaO | 14.0 | 14.0 | 14.0 |
| PbO | 10.0 | 10.0 | 10.0 |
| ZnO | 1.0 | 1.0 | 1.0 |
| MgO | 1.0 | 1.0 | 1.0 |
| $CaF_2$ | 2.0 | 2.0 | 2.0 |
| $B_2O_3$ |  | 2.0 | 2.0 |
| $TiO_2$ | 4.0 | 4.0 | 4.0 |
| $Li_2O$ | 1.9 | 1.9 | 1.9 |
| $Na_2O$ | 0.8 | 0.8 | 0.8 |
| $K_2O$ | 2.0 | 2.0 | 2.0 |
| Total, percent | 100.0 | 100.0 | 100.0 |
| Loss of weight in $H_2O$ test, percent | .014 | .019 | .019 |
| Melting temperature, °F | 2,400 | 2,400 | 2,400 |

From these three compositions it will be seen that if all other constituents remain substantially constant, the amounts of $SiO_2$ and $Al_2O_3$ may vary considerably without appreciably influencing the chemical durability in water, as long as the total amount of $SiO_2$ and $Al_2O_3$ remains constant. Thus, in Compositions 2 and 3 $SiO_2$ and $Al_2O_3$ differ, but the total of $SiO_2$ and $Al_2O_3$ is 61.3% in each case, and the loss in weight is likewise the same in each case, namely, .019%. This loss is weight is somewhat greater than for Composition 1 since the total of $SiO_2$ and $Al_2O_3$, which is 63.3% in Composition, is slightly less in Compositions 2 and 3.

|  | Compositions | | |
|---|---|---|---|
|  | 4 | 5 | 6 |
| Percent: | | | |
| $SiO_2$ | 48.3 | 43.5 | 48.0 |
| $Al_2O_3$ | 11.5 | 16.0 | 11.0 |
| CaO | 14.0 | 14.0 | 14.0 |
| PbO | 10.0 | 10.0 | 10.0 |
| ZnO | 1.0 | 1.0 | 1.0 |
| MgO | 1.0 | 1.0 | 1.0 |
| $CaF_2$ | 2.0 | 2.0 | 2.0 |
| $B_2O_3$ | 2.0 | 2.0 | 2.0 |
| $TiO_2$ | 4.0 | 4.0 | 4.0 |
| $Li_2O$ | 1.0 | 1.0 | 1.0 |
| $Na_2O$ | 1.6 | 0.5 |  |
| $K_2O$ | 3.6 | 5.0 | 6.0 |
| Total, percent | 100.0 | 100.0 | 100.0 |
| Loss of weight in water, percent | .024 | .024 | .024 |
| Melting temperature, °F | 2,425 | 2,400 | 2,425 |

In glasses having substantially the same total of $SiO_2$ and $Al_2O_3$ and being otherwise identically composed, except for $Na_2O$ and $K_2O$, the relative amounts of $Na_2O$ and $K_2O$ may vary considerably without affecting the chemical durability in water, as can clearly be seen from Compositions 4, 5 and 6.

|  | Compositions | | |
|---|---|---|---|
|  | 3 | 7 | 8 |
| Percent: | | | |
| $SiO_2$ | 50.8 | 48.3 | 48.3 |
| $Al_2O_3$ | 10.5 | 13.0 | 13.0 |
| CaO | 14.0 | 22.0 | 17.0 |
| PbO | 10.0 |  | 5.0 |
| BaO |  |  | 5.0 |
| ZnO | 1.0 | 2.0 |  |
| MgO | 1.0 | 1.0 | 1.0 |
| $CaF_2$ | 2.0 | 3.0 | 2.0 |
| $B_2O_3$ | 2.0 | 2.0 |  |
| $TiO_2$ | 4.0 | 4.0 | 4.0 |
| $Li_2O$ | 1.9 | 1.9 | 1.9 |
| $Na_2O$ | 0.8 | 0.8 | 0.8 |
| $K_2O$ | 2.0 | 2.0 | 2.0 |
| Total, percent | 100.0 | 100.0 | 100.0 |
| Loss of weight in $H_2O$, percent | .019 | .036 | .043 |
| Melting temperature, °F | 2,400 | 2,400 | 2,450 |

Composition 3 is here repeated to demonstrate that Compositions 3, 7 and 8 show that in glasses of similar compositions, with $SiO_2$ plus $Al_2O_3$ being held substantially constant, omission of PbO and the replacement thereof by substantially equal amounts of either CaO or CaO plus BaO cause an increased loss of weight in water, although the glasses of Compositions 7 and 8 are still to be regarded as absolutely very durable.

|  | Compositions ||
|---|---|---|
|  | 7 | 9 |
| Percent: |  |  |
| $SiO_2$ | 48.3 | 51.0 |
| $Al_2O_3$ | 13.0 | 11.0 |
| CaO | 22.0 | 20.0 |
| ZnO | 2.0 | 3.0 |
| MgO | 1.0 | 1.0 |
| $CaF_2$ | 3.0 | 1.0 |
| $B_2O_3$ | 2.0 | 2.0 |
| $TiO_2$ | 4.0 | 4.0 |
| $Li_2O$ | 1.9 | 3.0 |
| $Na_2O$ | 0.8 | 1.0 |
| $K_2O$ | 2.0 | 2.0 |
| Total, percent | 100.0 | 100.0 |
| Loss of weight in $H_2O$ test, percent | .036 | .026 |
| Melting temperature, °F | 2,400 | 2,385 |

A comparison between repeated Composition 7 and Composition 9 shows that an increase in total alkali may actually decrease the loss of weight in a water durability test, provided a substantial amount of the alkali is present in the form of $Li_2O$, and the other constituents are properly proportioned. This effect was not to be expected since it was the presence of alkali constituents, as has already been stated, that was regarded to be largely responsible for loss in weight in water durability tests. The presence of $Li_2O$ also lowers the upper and lower limits of the working temperature.

|  | Compositions |||
|---|---|---|---|
|  | 10 | 11 | 12 |
| Percent: |  |  |  |
| $SiO_2$ | 52.3 | 48.3 | 4.83 |
| $Al_2O_3$ | 13.0 | 11.0 | 15.0 |
| CaO | 14.0 | 14.0 | 14.0 |
| PbO | 10.0 | 10.0 | 10.0 |
| ZnO | 1.0 | 1.0 | 1.0 |
| MgO | 1.0 | 1.0 | 1.0 |
| $CaF_2$ | 1.0 | 2.0 | 2.0 |
| $B_2O_3$ | 2.0 | 4.9 |  |
| $TiO_2$ |  | 4.9 | 4.0 |
| $Li_2O$ | 1.9 | 1.9 | 1.9 |
| $Na_2O$ | 0.8 | 0.8 | 0.8 |
| $K_2O$ | 2.0 | 2.0 | 2.0 |
| Total, percent | 100.0 | 100.0 | 100.0 |
| Loss in weight in $H_2O$ test, percent | .049 | .018 | .014 |
| Melting temperature, °F | 2,450 | 2,430 | 2,400 |

Compositions 10, 11 and 12 are interesting in showing that in glasses of similar compositions the use of small amounts of $TiO_2$ decreases the loss of weight in a water durability test substantially.

|  | Compositions ||
|---|---|---|
|  | 13 | 14 |
| Percent: |  |  |
| $SiO_2$ | 40.0 | 59.0 |
| $Al_2O_3$ | 15.0 | 7.0 |
| $B_2O_3$ | 6.0 | 4.0 |
| CaO | 20.0 | 9.0 |
| PbO | 11.0 |  |
| ZnO |  | 11.0 |
| MgO |  |  |
| $TiO_2$ | 6.0 | 3.0 |
| $ZrO_2$ |  | 3.0 |
| $Li_2O$ | 1.0 | 1.0 |
| $Na_2O$ | 1.0 | 2.0 |
| $K_2O$ |  | 2.0 |
| Total, percent | 100.0 | 100.0 |
| Loss of weight in $H_2O$ test, percent | .029 |  |
| Melting temperature, °F | 2,350 | 2,350 |

Composition 13 was formulated so that the total of $SiO_2$ plus $Al_2O_3$ was at the lower limit of 55%. Composition 14 contained a total of $SiO_2$ plus $Al_2O_3$ at the upper limit of 66%.

The glasses of both of these compositions melted readily. Composition 13 showed excellent durability against water.

The following listing will show the superior chemical durability of our compositions:

|  | Loss of weight in $H_2O$ | Loss of weight in 5% HCl test |
|---|---|---|
| Compositions according to the present invention, inc. 10% PbO | .014–.024 | .40–.60 |
| Present compositions without PbO | .026–.049 | .44–.88 |
| "Prior composition" | .041–.055 | 1.20 |
| Soda-lime window glass | .164 |  |

Thus, it appears that our glass is better in chemical durability than one of the best of the known fiber glass compositions, the predominantly used composition and, of course, very much better than soda-lime window glass.

It is believed that the features and advantages of our invention will be clear from the foregoing. It will be seen that our novel glass compositions melt at lower temperatures than known compositions, that they can be attenuated at lower temperatures, and that they yield a fiber of high chemical durability. In every other respect, our fiber is as satisfactory as known fibers. While from the "prior composition" fibers can be drawn at approximately 15,000 f.p.m. when the glass temperature is 2475° F., our fibers can be drawn at the same speed at 2125° F. or a temperature 350° F. lower.

It will be apparent that while we have described a number of formulations of the glass composition of our invention, many changes and modifications may be made without departing from the spirit of the invention defined in the appended claims.

We claim:

1. Glass consisting essentially of

|  | Percent |
|---|---|
| $SiO_2$ | 40 to 59 |
| $Al_2O_3$ | 7 to 17 |
| CaO | 9 to 24 |
| PbO | 0 to 11 |
| ZnO | 0 to 11 |
| BaO | 0 to 5 |
| MgO | 0 to 5 |
| $CaF_2$ | 0 to 3 |
| $B_2O_3$ | 0 to 6 |
| $TiO_2$ | 0 to 7 |
| $ZrO_2$ | 0 to 4 |
| $Li_2O$ | 1 to 4 |
| $Na_2O$ | 0 to 2 |
| $K_2O$ | 0 to 6 | the combined amounts of $Li_2O$, $Na_2O$ and $K_2O$ varying between 2 and 7%.

2. In the glass according to claim 1, the combined amounts of $SiO_2$ and $Al_2O_3$ varying between approximately 55 and 66 percent.

3. In the glass according to claim 1, the combined amounts of CaO, PbO, ZnO, BaO, and MgO varying between approximately 19 and 31 percent.

4. The glass according to claim 1, wherein, out of CaO, PbO, ZnO, BaO and MgO, CaO is present beside at least one of the oxides ZnO and MgO.

5. The glass according to claim 1, wherein, out of $Li_2O$, $Na_2O$, and $K_2O$, $Li_2O$ is present beside at least one of the oxides $Na_2O$ and $K_2O$.

6. A glass consisting essentially of

| | Percent |
|---|---|
| $SiO_2$ | 48.3 |
| $Al_2O_3$ | 15.0 |
| CaO | 14.0 |
| PbO | 10.0 |
| ZnO | 1.0 |
| MgO | 1.0 |
| $CaF_2$ | 2.0 |
| $TiO_2$ | 4.0 |
| $Li_2O$ | 1.9 |
| $Na_2O$ | 0.8 |
| $K_2O$ | 2.0 |

7. A glass consisting essentially of

| | Percent |
|---|---|
| $SiO_2$ | 48.3 |
| $Al_2O_3$ | 11.5 |
| CaO | 14.0 |
| PbO | 10.0 |
| ZnO | 1.0 |
| MgO | 1.0 |
| $CaF_2$ | 2.0 |
| $B_2O_3$ | 2.0 |
| $TiO_2$ | 4.0 |
| $Li_2O$ | 1.0 |
| $Na_2O$ | 1.6 |
| $K_2O$ | 3.6 |

8. A glass consisting essentially of

| | Percent |
|---|---|
| $SiO_2$ | 48.0 |
| $Al_2O_3$ | 11.0 |
| CaO | 14.0 |
| PbO | 10.0 |
| ZnO | 1.0 |
| MgO | 1.0 |
| $CaF_2$ | 2.0 |
| $B_2O_3$ | 2.0 |
| $TiO_2$ | 4.0 |
| $Li_2O$ | 1.0 |
| $K_2O$ | 6.0 |

9. A glass consisting essentially of

| | Percent |
|---|---|
| $SiO_2$ | 48.3 |
| $Al_2O_3$ | 13.0 |
| CaO | 22.0 |
| ZnO | 2.0 |
| MgO | 1.0 |
| $CaF_2$ | 3.0 |
| $B_2O_3$ | 2.0 |
| $TiO_2$ | 4.0 |
| $Li_2O$ | 1.9 |
| $Na_2O$ | 0.8 |
| $K_2O$ | 2.0 |

10. A glass consisting essentially of

| | Percent |
|---|---|
| $SiO_2$ | 51.0 |
| $Al_2O_3$ | 11.0 |
| CaO | 20.0 |
| ZnO | 3.0 |
| MgO | 1.0 |
| $CaF_2$ | 1.0 |
| $B_2O_3$ | 2.0 |
| $TiO_2$ | 4.0 |
| $Li_2O$ | 3.0 |
| $Na_2O$ | 1.0 |
| $K_2O$ | 2.0 |

11. A glass consisting essentially of

| | Percent |
|---|---|
| $SiO_2$ | 48.3 |
| $Al_2O_3$ | 11.0 |
| CaO | 14.0 |
| PbO | 10.0 |
| ZnO | 1.0 |
| MgO | 1.0 |
| $CaF_2$ | 2.0 |
| $B_2O_3$ | 4.0 |
| $TiO_2$ | 4.0 |
| $Li_2O$ | 1.9 |
| $Na_2O$ | 0.8 |
| $K_2O$ | 2.0 |

12. In the manufacture of glass fibers, the method which includes melting $SiO_2$ 40% to 59%, $Al_2O_3$ 7% to 17%, CaO 9% to 24%, PbO 0% to 11%, ZnO 0% to 11%, BaO 0% to 5%, MgO 0% to 5%, $CaF_2$ 0% to 3%, $B_2O_3$ 0% to 6%, $TiO_2$ 0% to 7%, $ZrO_2$ 0% to 4%, $Li_2O$ 1% to 4%, $Na_2O$ 0% to 2%, $K_2O$ 0% to 6%, the combined amounts of $Li_2O$, $Na_2O$ and $K_2O$ varying between 2 and 7%, and drawing fibers from the molten glass thus obtained at a temperature varying between approximately 2000° F. and 2450° F., the logarithm of viscosity at said temperatures equaling 3 and 2, respectively.

13. Glass fibers consisting essentially of

| | Percent |
|---|---|
| $SiO_2$ | 40 to 59 |
| $Al_2O_3$ | 7 to 17 |
| CaO | 9 to 24 |
| PbO | 0 to 11 |
| ZnO | 0 to 11 |
| BaO | 0 to 5 |
| MgO | 0 to 5 |
| $CaF_2$ | 0 to 3 |
| $B_2O_3$ | 0 to 6 |
| $TiO_2$ | 0 to 7 |
| $ZrO_2$ | 0 to 4 |
| $Li_2O$ | 1 to 4 |
| $Na_2O$ | 0 to 2 |
| $K_2O$ | 0 to 6 | the combined amounts of $Li_2O$, $Na_2O$ and $K_2O$ varying between 2 and 7%.

References Cited in the file of this patent
UNITED STATES PATENTS

| 2,334,961 | Schoenlaub | Nov. 23, 1943 |
| 2,571,074 | Trede et al. | Oct. 9, 1951 |
| 2,664,359 | Dingledy | Dec. 29, 1953 |
| 2,877,124 | Welsch | Mar. 10, 1959 |